W. A. McKINNEY.
TRACTION WHEEL.
APPLICATION FILED AUG. 15, 1910.
980,981.
Patented Jan. 10, 1911.
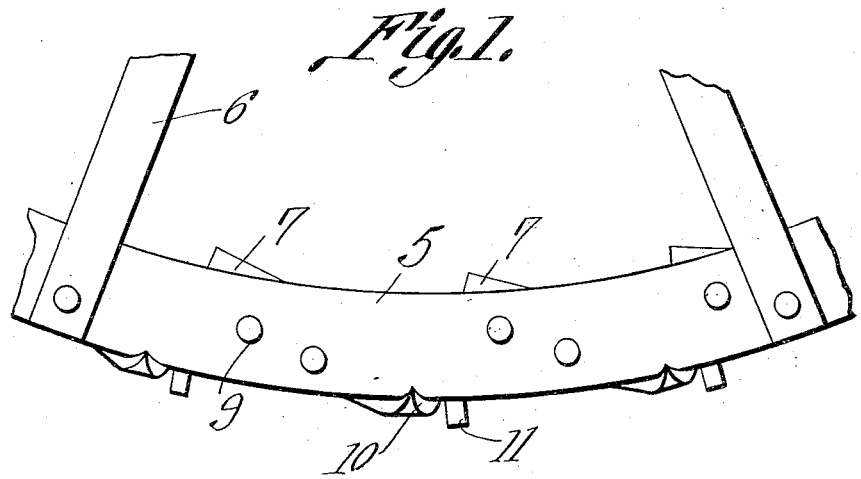
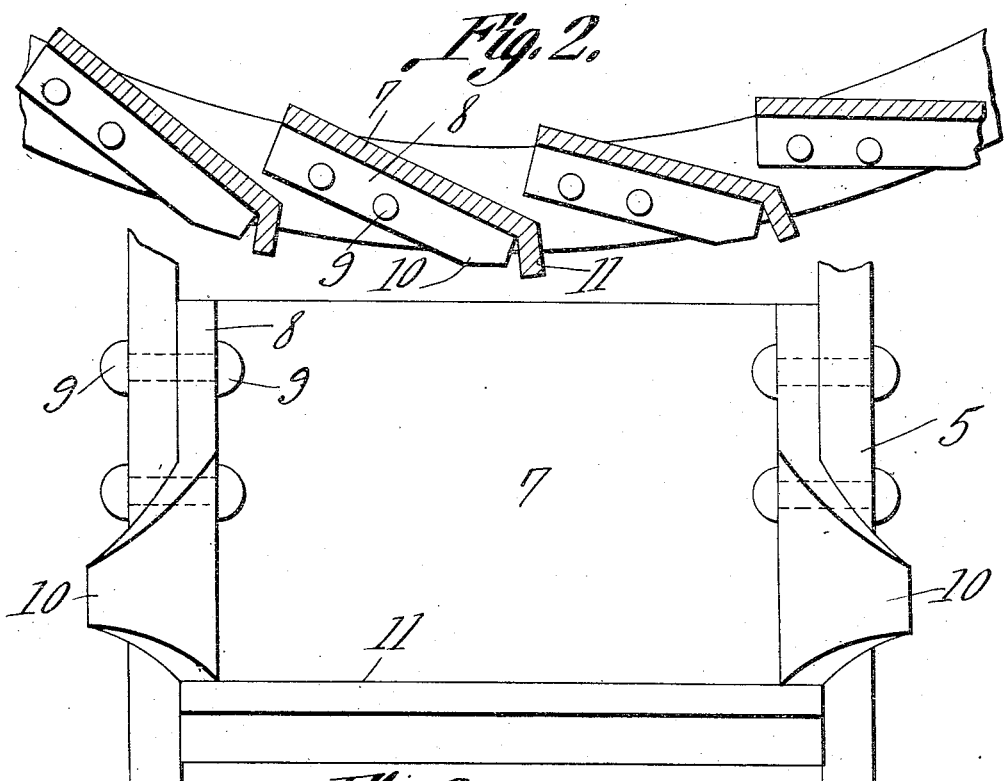
Witnesses
William A. McKinney, Inventor
by Attorneys

UNITED STATES PATENT OFFICE.

WILLIAM A. McKINNEY, OF GAINESVILLE, GEORGIA.

TRACTION-WHEEL.

980,981.  Specification of Letters Patent.  Patented Jan. 10, 1911.

Application filed August 15, 1910. Serial No. 577,156.

*To all whom it may concern:*

Be it known that I, WILLIAM A. McKINNEY, a citizen of the United States, residing at Gainesville, in the county of Hall and State of Georgia, have invented a new and useful Traction-Wheel, of which the following is a specification.

It is the object of the present invention to provide an improved construction of traction wheel and the primary aim of the invention is to provide a wheel of this type which will embody treads so constructed as to compress the soil in a direction opposite to the direction of travel and will therefore more effectually hold in the soil than treads which merely dig into the soil and push it in a rearward direction.

A further aim of the invention is to so construct and arrange the treads of the wheel that accumulation of soil upon or between them will be obviated.

It is a further aim of the invention to provide a traction wheel which will effectually hold to the ground surface whether the soil be in soft or hard condition.

With the above and other objects in view, the invention resides in the construction and arrangement of elements shown in the accompanying drawings, in which, Figure 1 is a view in side elevation of a portion of a traction wheel constructed in accordance with the present invention. Fig. 2 is a vertical sectional view taken through the portion of the wheel shown in Fig. 1, taken in a direction from front to rear. Fig. 3 is a bottom plan view of a portion of the wheel showing one of the treads and the two rims between which it is mounted.

In the drawings, the wheel is illustrated as embodying, in its structure, two rims or two rim sections indicated by the numeral 5. Each of these rims is preferably formed from a length of bar metal bent into annular form and having its ends welded or otherwise permanently secured together. The spokes of the wheel indicated by the numeral 6 and of any desired form, and number, are secured to the rims 5, preferably at corresponding points. The treads of the wheel are held between the two rims 5 in an annular series as will now be explained.

Each tread of the wheel is in the nature of a plate of stout sheet metal the body portion of which is indicated by the numeral 7 and at its ends this plate is formed with a flange 8 which is bent down to extend at right angles to the under tread surface of the body 7. Rivets or other suitable securing devices indicated by the numeral 9 are fastened through the flanges 8 and the rims 5, the treads being in this manner held to extend between the rims and they are so secured in place that they will come into contact with the ground on an angle of about 25°. Those corners of the flanges 8 which are presented in the direction of travel of the wheel, are bent laterally to extend beneath the outer peripheries of the corresponding rims 5 as indicated by the numeral 10 and this bending of the corners serves to taper them to a greater or less degree as is clearly shown in Fig. 1 of the drawings. It will further be observed that the forward edge portion of the body 7 of each tread is bent downwardly at an acute angle to the said body portion as indicated by the numeral 11 and this down bent portion or flange 11 affords, in conjunction with the laterally bent corners of the flanges 8, the toe of the tread. In other words, when the wheel is traveling over the surface of the ground, the flanges 11 and laterally bent corners 10 of each tread will first dig into the soil and the body of the tread will bear down and backwardly against the soil, the laterally bent corners 10 being highly efficient when the wheel is traveling over hard or solid ground and the flanges 11 being efficient to the same degree when the wheel is traveling over soft ground. Thus, it will be seen that the wheel is adapted for travel over ground of almost any character and that the soil is compressed and in a direction substantially opposite to the direction of travel as well as downwardly and is not raked up and merely thrown rearwardly as is the case in certain forms of such wheels now in general use.

It will be observed from an inspection of Fig. 2 of the drawings that the rear edge of the body of each tread is in substantially radial alinement with or located radially inwardly of the forward edge or flange 11 of the body of the tread next to the rear. It will also be observed that while the treads are so arranged, they are spaced so that soil will not pack between them but will be readily discharged as the wheel rotates. Furthermore it will be observed that by bending the lower forward corners of the flanges 8 around beneath the outer peripheries of the rims 5, inward pressure exerted against the bodies of the treads will be better resisted than should the said corners extend radially. In other words, the engagement of the corners of the flanges about the outer peripheries of the rims serves to aid the rivets 9 in holding the treads in place between the rims.

What is claimed is:—

1. In a traction wheel, spaced rims, treads supported between the rims and comprising a body having lateral flanges secured to the rims, the lower forward corners of the flanges being bent around the outer peripheries of the corresponding rims.

2. In a traction wheel, spaced rims, treads supported between the rims and comprising a body having lateral flanges secured to the rims, the lower forward corners of the flanges being bent around the outer peripheries of the corresponding rims, the said body being formed at its forward edge with an outwardly presented flange.

3. In a traction wheel, spaced rims, treads supported between the rims and comprising a body having lateral flanges secured to the rims, the lower forward corners of the flanges being bent around the outer peripheries of the corresponding rims, the said body being formed at its forward edge with an outwardly presented flange extending between the said corners of the two lateral flanges of the body.

In testimony that I claim the foregoing as my own, I have hereto affixed my signature in the presence of two witnesses.

WILLIAM A. McKINNEY.

Witnesses:
   C. P. NEESE,
   R. J. SANDERS.